(12) United States Patent
Blasi et al.

(10) Patent No.: US 11,589,038 B2
(45) Date of Patent: Feb. 21, 2023

(54) METHODS FOR VIDEO ENCODING AND VIDEO DECODING

(71) Applicant: British Broadcasting Corporation, London (GB)

(72) Inventors: Saverio Blasi, London (GB); Andre Seixas Dias, London (GB); Gosala Kulupana, London (GB)

(73) Assignee: BRITISH BROADCASTING CORPORATION, London (GB)

( * ) Notice: Subject to any disclaimer, the term of this patent is extended or adjusted under 35 U.S.C. 154(b) by 0 days.

(21) Appl. No.: 17/413,370

(22) PCT Filed: Dec. 10, 2019

(86) PCT No.: PCT/GB2019/053489
§ 371 (c)(1),
(2) Date: Jun. 11, 2021

(87) PCT Pub. No.: WO2020/120948
PCT Pub. Date: Jun. 18, 2020

(65) Prior Publication Data
US 2022/0060686 A1  Feb. 24, 2022

(30) Foreign Application Priority Data
Dec. 14, 2018 (GB) ...................................... 1820459

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/176* (2014.11); *H04N 19/51* (2014.11); *H04N 19/593* (2014.11)

(58) Field of Classification Search
CPC .... H04N 19/105; H04N 19/109; H04N 19/11; H04N 19/176; H04N 19/46; H04N 19/51; H04N 19/593; H04N 19/107; H04N 19/70
See application file for complete search history.

(56) References Cited

U.S. PATENT DOCUMENTS 9,609,343 B1  3/2017  Chen et al.
10,904,522 B2  1/2021  Lim et al.
(Continued)

FOREIGN PATENT DOCUMENTS

EP      3217663       9/2017
JP      2015213367    11/2015
(Continued)

OTHER PUBLICATIONS

International Search Report and Written Opinion dated Jan. 30, 2020, in connection with International Application No. PCT/GB2019/053489 (8 pages).
(Continued)

*Primary Examiner* — Jessica M Prince
(74) *Attorney, Agent, or Firm* — McCracken & Gillen LLC

(57) ABSTRACT

Efficient prediction of samples within a block in a video encoder and decoder by means of computing both an inter-predicted prediction hypothesis as well as an intra-predicted prediction-hypothesis. The two prediction hypotheses are then combined together by means of parametric transformation to form a new prediction hypothesis which may be more accurate in predicting the content of the original block.

13 Claims, 8 Drawing Sheets

(51) Int. Cl.
  *H04N 19/51* (2014.01)
  *H04N 19/593* (2014.01)

(56) References Cited

U.S. PATENT DOCUMENTS

| | | | |
|---|---|---|---|
| 2012/0008675 | A1 | 1/2012 | Karczewicz et al. |
| 2012/0314766 | A1 | 12/2012 | Chien et al. |
| 2013/0051467 | A1 | 2/2013 | Zhou et al. |
| 2017/0251213 | A1* | 8/2017 | Ye .................. H04N 19/159 |
| 2018/0249156 | A1 | 8/2018 | Heo et al. |
| 2018/0302631 | A1 | 10/2018 | Chiang et al. |
| 2018/0376149 | A1* | 12/2018 | Zhang .............. H04N 19/182 |
| 2019/0052886 | A1* | 2/2019 | Chiang ............. H04N 19/198 |
| 2019/0356915 | A1 | 11/2019 | Jang et al. |
| 2020/0053364 | A1* | 2/2020 | Seo ................. H04N 19/503 |
| 2020/0204824 | A1* | 6/2020 | Lai .................. H04N 19/126 |

FOREIGN PATENT DOCUMENTS

| | | |
|---|---|---|
| KR | 2018/0082337 | 7/2018 |
| WO | 2013039908 | 3/2013 |
| WO | 2016/074744 | 5/2016 |
| WO | 2017058615 A1 | 4/2017 |
| WO | 2017189048 | 11/2017 |
| WO | 2018/128466 | 7/2018 |
| WO | 2018/132380 | 7/2018 |
| WO | 2018127188 | 7/2018 |
| WO | 2019177429 | 9/2019 |

OTHER PUBLICATIONS

Combined Search and Examination Report dated May 30, 2019, for United Kingdom Patent Application No. GB1820459.4 (3 pages).
Bossen F et al, "Non-CE3: A unified luma intra mode list construction process", No. JVETM0528, Jan. 11, 2019 (Jan. 11, 2019), 13. JVET Meeting; Jan. 9, 2019-Jan. 18, 2019; Marrakech; (The Joint Video Exploration Team of ISO/IEC JTC1/SC29/WG11 and ITU-T SG.16) (4 pages).
Jie Yao et al., "Non-CE3: Intra prediction information coding", No. JVET-M0210, Jan. 11, 2019 (Jan. 11, 2019), 13. JVET Meeting; Jan. 9, 2019-Jan. 18, 2019; Marrakech; (The Joint Video Exploration Team of ISO/IEC JTC1/SC29/WG11 and ITU-T SG.16) (8 pages).
Blasi S et al., "CE3-related: Simplified unified luma intra mode coding", No. JVET-N0303, Mar. 12, 2019 (Mar. 12, 2019), 14. JVET Meeting; Mar. 19, 2019-Mar. 27, 2019; Geneva; (The Joint Video Exploration Team of ISO/IEC JTC1/SC29/WG11 and ITU-T SG.16) (6 pages).
International Search Report and Written Opinion dated Mar. 13, 2020, in connection with International Application No. PCT/GB2019/053697 (13 pages).
International Preliminary Report on Patentability, issued by the International Bureau on behalf of the International Searching Authority dated Sep. 23, 2021, in connection with International Patent Application No. PCT/GB2019/053697 (11 pages).
Combined Search and Examination Report dated Sep. 9, 2019, for United Kingdom Patent Application No. GB1903170.7 (3 pages).
Combined Search and Examination Report dated Feb. 12, 2020, for United Kingdom Patent Application No. GB 1903170.7 (3 pages).
International Preliminary Report on Patentability, issued by the International Bureau on behalf of the International Searching Authority dated Jun. 8, 2021, in connection with International Patent Application No. PCT/GB2019/053489 (7 pages).
Ru-Ling Liao, Chong Soon Lim, CE10.3.1.b: Triangular Prediction Unit Mode, JVET, Document JVET-L0124-v2, 12th Meeting, Macao, CN, Oct. 3-12, 2018 (8 pages).
M. Blaser, J. Sauer, and M. R. Wien, Description of SDR and 360° Video Coding Technology Proposal by RWTH Aachen University, JVET, Document JVET-J0023, 10th Meeting, San Diego, US, Apr. 10-20, 2018 (102 pages).
Y. Ahn, H. Ryu, D. Sim, Diagonal Motion Partitions on Top of QTBT Block Structure, JVET, Document JVET-H0087, 8th Meeting, Macao, CN, Oct. 18-25, 2017 (6 pages).
M. Blaser, J. Sauer, and M. R. Wien, CE10: Results on Geometric Block Partitioning (Test 3.3), JVET, Document JVET-K0146, 11th Meeting, Ljubljana, SI, Jul. 10-18, 2018 (2 pages).
J. Chen et al., Algorithm Description for Versatile Video Coding and Test Model 3 (VTM 3), JVET, Document JVET-L1002, 12th Meeting, Macao, CN, Oct. 3-12, 2018 (48 Pages).
B. Bross et al., Versatile Video Coding (Draft 3); JVET, Document JVET-L1001-v9, 12th Meeting, Macao, CN, Oct. 3-12, 2018, (238 pages).
Combined Search and Examination Report dated Jun. 28, 2019, for United Kingdom Patent Application No. GB1821283.7 (8 pages).
International Search Report and Written Opinion dated Jan. 8, 2020, in connection with International Application No. PCT/GB2019/053124 (11 pages).
International Preliminary Report on Patentability, issued by the International Bureau on behalf of the International Searching Authority dated Jun. 16, 2021, in connection with International Patent Application No. PCT/GB2019/053124 (10 pages).
Chen et al., Algorithm Description of Joint Exploration Test Model 4, JVET, Document JVET-D1001_v3, 4th Meeting, Chengdu, CN, Oct. 15-21, 2016 (40 pages).
Abe et al., CE6: AMT and NSST complexity reduction (CE6-3.3), JVET, Document JVET-K0127-v2, 11th Meeting, Ljubljana, SI, Jul. 10-18, 2018 (6 pages).
International Search Report and Written Opinion dated Jul. 9, 2020 in connection with International Application No. PCT/EP2020/061053 (11 pages).
Combined Search and Examination Report dated Dec. 4, 2019, for United Kingdom Patent Application No. GB1909102.4 (9 pages).
Bross et al., Versatile Video Coding (Draft 5), JVET, Document JVET-N1001-v8, 14th Meeting, Geneva, CH, Mar. 19-27, 2019 (400 pages).
M. Chiang, C. Hsu, Y. Huang, S. Lei, CE10.1: Combined and Multi-Hypothesis Prediction, Document JVET-K0257-v1, 11th JVET Meeting, Ljubljana, SI, Jul. 2018 (6 pages).
W. Xu, H. Yang, Y Zhao, J. Chen, CE10-related: Inter Prediction Sample Filtering, Document JVET-L0375-v1, 12th JVET Meeting, Macao, CN, Oct. 2018 (4 pages).

* cited by examiner

CURRENT FRAME

REFERENCE FRAME

CURRENT BLOCK

INTER-PREDICTION CANDIDATE

INTRA-PREDICTION CANDIDATE

METHODS FOR VIDEO ENCODING AND VIDEO DECODING

FIELD

This disclosure relates to video encoding and video decoding.

BACKGROUND

Video compression provides opportunities to reduce payload on a transmission channel. Known video coding standards enable transmission of bitstream data defining a video, such that a receiver of the bitstream is able to decode the bitstream in such a way as to construct a decoded video which is substantially faithful to the original video from which the encoded bitstream was derived.

Early video coding standards were devised with a view to reproduction of video on equipment where relatively low or medium quality reconstruction is acceptable. This includes hand-held devices or personal computing devices. To a large extent, the acceptability of particular levels of quality is as much driven by user demand as by the capability of the playback equipment.

As receiver equipment improves in quality and capability, so does user demand for higher quality reproduction of original video. The technical objective thus emerges to enable reproduction of video on a player, to a higher quality than hitherto implemented.

DESCRIPTION OF EMBODIMENTS

Figure 1:
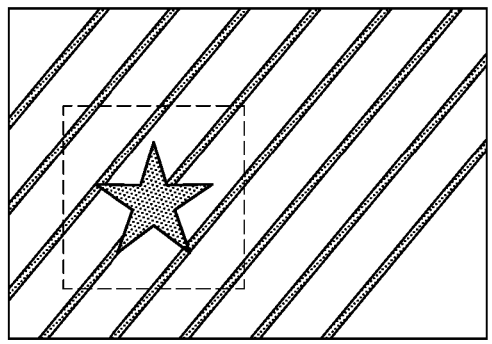
FIG. 1 is an illustrative example of a frame to be encoded, transmitted and decoded by embodiments disclosed herein.

In general terms, embodiments disclosed herein provide efficient prediction of samples within a block in a video encoder and decoder by means of computing both an inter-predicted prediction hypothesis as well as an intra-predicted prediction-hypothesis. The two prediction hypotheses are then combined together by means of a parametric transformation to form a new prediction hypothesis which may be more accurate in predicting the content of the original block. Information may be provided to the decoder to enable determination of a parametric transformation to be used.

According to one embodiment, a method of encoding a block of pixels in an image of a sequential plurality of images, comprises:

computing a set of motion compensated inter-prediction candidates for the block of pixels on the basis of a reference image in the sequential plurality of images;

computing a set of intra-prediction candidates for the block of pixels, based on a predetermined set of intra-prediction modes;

assembling a set of combinations of said motion compensated inter-prediction candidates and intra-prediction candidates;

determining, for a plurality of sets of parameters, each set of parameters configuring a parametric transformation of a one of the motion compensated inter-prediction candidate and a one of the intra-prediction candidates, a combined prediction for each combination of said motion compensated inter-prediction candidates and intra-prediction candidates;

assessing each combined prediction against a measurement;

selecting one of the combined predictions on the basis of the measurement as an encoding of the block of pixels.

Another embodiment provides an encoder configured to perform the above encoding process. The encoder may be incorporated into a suitable signal processing apparatus.

According to another embodiment, a method of decoding a bitstream comprises:

extracting from the bitstream motion predictor configuration information and, based on the motion predictor configuration information, computing one or more motion-compensated inter-prediction candidates for a block of samples;

extracting from the bitstream intra-prediction configuration information, and, based on the intra-prediction configuration information, computing one or more intra-prediction candidates, wherein intra-prediction candidates are obtained by an intra-prediction process for a block of samples;

extracting from the bitstream parameter transformation configuration information enabling determination of parameters for a parametric transformation of the one or more motion-compensated inter-prediction candidates, and the one or more intra-prediction candidates;

determining parametric transformation parameters on the basis of the parameter transformation configuration information; and computing a combined transformed prediction for said block of samples, by way of a parametric transformation of the one or more motion-compensated inter-prediction candidates, and the one or more intra-prediction candidates, the parametric transformation being governed by the parametric transformation parameters.

Another embodiment provides a decoder configured to perform the above decoding process. The decoder may be incorporated into a suitable signal receiving apparatus.

Another embodiment provides a computer program product comprising computer executable instructions operable to configure a computer apparatus to perform a method as stated above.

As will be appreciated by the reader, a video presentation generally comprises a plurality of frames, for sequential display on playback equipment. Various strategies are used to reduce the amount of data required to describe each frame in turn on a bitstream transmitted on a communications channel from an emitter to a receiver. As will be understood, the emitter will comprise an encoder for encoding the frame data into a bitstream, and the receiver will comprise a decoder for generating frame data on the basis of information borne in the bitstream.

In embodiments of the present disclosure, each frame of the video presentation is partitioned into blocks. At the encoder, the content of a block is predicted based on previously compressed content. This block prediction is subtracted from the actual block, resulting in a set of residual differences (residuals). In an embodiment, the residual data can be encoded using a transformation into the frequency domain.

However, as will be recognised by the reader, the transform of data from the time domain to the frequency domain may be specific to certain implementations, and is not essential to the performance of disclosed embodiments.

The residuals, whether transformed or not, may then be scaled to accommodate further processing.

The quantised residuals are then encoded using an entropy coder into a set of coefficients, which are placed on the bitstream with the block prediction. Various technical standards commonly define a signal structure for the bitstream, and a syntax for organisation of information alongside identification of a block prediction, so that a decoder can reliably extract coefficients for decoding.

A decoder is configured to receive a bitstream. Generally, the decoder is configured to expect a bitstream to be organised according to a predetermined syntactical structure, so that data can be extracted predictably and reliably. Such a syntactical structure could be agreed collaboratively, such as in accordance with a technical standard. Alternatively, the syntactical structure may be defined by a particular manufacturer or other contributor.

The decoder according to an embodiment extracts coefficients from the bitstream. These coefficients are decoded to produce decoded data. The decoded data is then inverse-quantised. An option may exist to specify whether or not domain transformation is to be used on the received bitstream. If domain transformation is specified, the inverse-quantised data is inverse-transformed to obtain reconstructed residuals. Information on how to compute a prediction block is also extracted from the bitstream and decoded; this is then used to form a prediction block using previously reconstructed data. The reconstructed residuals are then added to the formed prediction block to obtain a reconstructed block.

It will be understood that, at the commencement of a transmission, it may be required to send a complete block of data representative of a complete frame of a video presentation, without reference to any other frame. All subsequent prediction-based data can then ensue from the initial conditions established by that reference frame. The reference frames may be constant for the encoding and decoding of the whole video presentation, or may be updated. For instance, a scene change may predicate updating the reference frame, as frames of a new scene may bear little or no resemblance to the previously established reference frame. Even within a scene, frames may diverge sufficiently as to reduce the efficiency of coding with respect to the reference frame in comparison to encoding and transmitting an updated reference frame.

It will be appreciated that the reference frame, for a particular frame under consideration, need not be prior to the frame under consideration in the sequence of the video presentation. A reference frame may be in the future with respect to the frame under consideration.

Reference frames may be compressed and communicated separately from encoded parameters from which predictions can be formed. Reference frames may be indexed, such that the reference frame to be used in forming a particular prediction block can be indicated in the bitstream.

Embodiments described herein relate to a process of forming a prediction block. In conventional video coding schemes, intra-prediction or inter-prediction are used. Intra-prediction methods involve computation of a prediction using previously compressed content extracted from within the same frame as the current block being predicted. By contrast, inter-prediction methods involve predicting the content of a block of original samples by using previously compressed portions of the video signal extracted from previously compressed frames.

The nomenclature used to describe partitions of frames is diverse. For example, in HEVC, the term "slice" is used in to describe a partition of a frame—a slice can comprise a plurality of blocks. The terminology used to describe partitions of frames in this disclosure does not imply specific applicability of present embodiments to particular standardised technology, nor does it imply exclusion from applicability to other standardised technology using other terms for similar concepts.

In general terms, aspects of the current disclosure relate to a method to efficiently predict the samples within a block in a video encoder end decoder by means of computing both an inter-predicted prediction hypothesis as well as an intra-predicted prediction-hypothesis. The two prediction hypotheses are then combined together to form a new prediction hypothesis which may be more accurate in predicting the content of the original block.

An embodiment provides a method of combining the two prediction hypotheses, on the basis of a combination algorithm. The combination algorithm can be pre-set in the receiver. The combination algorithm can be specified using information communicated to the receiver. The receiver may store a library of combination algorithms, and may select and employ one of these stored algorithms on the basis of information extracted from the received bitstream.

One approach to combination by the combination algorithm is the utilisation of a weighted average. This may be a weighted arithmetic mean of the two prediction hypotheses. Weights to be employed in the weighted average may be pre-set, or parameters may be communicated on the bitstream to the receiver to enable calculation, determination or selection of weights to be used.

In an embodiment, the information on the bitstream may comprise values of the weights to be employed in the weighted average.

In an embodiment, the information on the bitstream may comprise a weight selection parameter, on the basis of which a receiver may be responsive to select a particular one of a plurality of pre-stored weights. It will be recognised that, for a weighted arithmetic mean of two prediction hypotheses, a single weight value is sufficient to describe the combination algorithm, in that one of the two hypotheses will be multiplied by a specified weight w and the other of the hypotheses will be multiplied by a complementary weight (1−w). Other algorithms may be implemented. In the event that more than two prediction hypotheses are employed, and need to be combined, more weights may be specified to enable weighted combination.

Other factor based combination algorithms may be specified. For instance, a function other than a weighted average may be specified, for which coefficients can be specified in the bitstream, and received and extracted at the receiver. For example, a linear or quadratic function may be used to interpolate the values in the plurality of prediction hypotheses. The coefficients of the linear or quadratic function may be computed, selected or determined based on information extracted from the bitstream.

A parameter may be provided in the bitstream, for extraction and use at the receiver, specifying whether or not a particular algorithm is to be employed. In the event that two combination algorithms are specified as available for use at the receiver, such a parameter may be Boolean.

In particular, an embodiment provides a mechanism used to compute a motion compensated prediction. A motion compensation prediction is a technique, hitherto harnessed in numerous technologies, such as MPEG, which provides to a decoder certain "motion information". In general terms, motion compensation prediction comprises determining a difference between a current frame and a reference frame, in terms of a transformation from the reference frame to the current frame. If the current frame and the reference frame were, for instance, captured by a stationary camera of a scene in which no objects have moved (but, for instance, lighting effects may have changed over time), a simple subtraction of the reference frame from the current frame provides an efficient basis for compression. However, if the point of view, from which the camera has been set, moves between the reference frame and the current frame, and/or objects in the viewed scene have moved, then a simple subtraction is not sufficient to efficiently describe the difference. In such a case, motion vectors should be used to describe the transformation between the current frame and the reference frame.

In the event that only an object has moved within the scene, but a background of the scene has remained unchanged, consideration of a partition, for example a block, of the frame is appropriate. In such a case, the transformation between a block of the current frame and a block of the reference frame may simply be described as a translation, i.e. a shift, which can be expressed as a motion vector.

This motion information is manifested as motion vectors and a reference frame index. Such information is compressed and included in the bitstream. Different techniques may be used to compress the motion information. For instance, when using merge prediction, the decoder computes a set of candidates, namely a set of hypotheses built using motion information extracted from neighbouring blocks. Then, an index is signalled to determine the correct hypothesis for the current block. This enables the decoder to perform motion compensation while requiring very few bits to compress the necessary motion information.

Embodiments described herein relate to a method of decoding a bitstream bearing information for reconstruction of a plurality of frames of video content, each frame being composed of one or more blocks, the method comprising computing prediction of a block by computing a plurality of differently computed prediction candidates and combining the candidates to produce a combined prediction.

In an embodiment, the plurality of prediction candidates may comprise one candidate computed by inter-prediction and one candidate computed by intra-prediction. In an embodiment, the candidates may be combined by way of a parametric transformation. In an embodiment, the parametric transformation may comprise a weighted prediction, characterised by one or more weights. In an embodiment, the weight or weights may be extracted from the bitstream.

In an embodiment, the weight or weights may be computed, determined or selected based on coefficients or parameters extracted from the bitstream.

The reader will appreciate that both inter- and intra-prediction implementations achieve satisfactory results in video compression schemes. However, circumstances may arise in which using a single prediction process to predict all samples within a block may not be ideal.

For instance, a case will now be examined of an object moving on a static background. From frame to frame, the object will be represented in successively different positions across the background. In case the object cannot be segmented using the partitioning scheme in use in the video codec, then existing prediction methods will not be able to accurately predict the content of the current block. Using inter-prediction will lead to a prediction candidate that contains an accurate prediction of the moving object, but not of the background. By contrast, using intra-prediction methods may lead to a satisfactory prediction of the background, but not of the details of the object within the block.

The reader will note that what constitutes a satisfactory outcome to decoding depends on user expectation. Objective standards measuring the accuracy of reproduction of encoded images may be established, for instance based on an objective distortion metric. However, in combination with this, consideration may be given to a general subjective impression from a user that a particular decoding produces visually satisfactory results.

Figure 2:
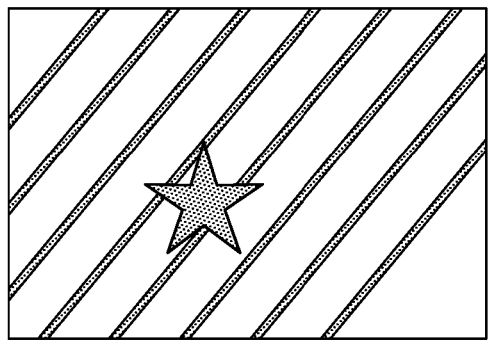
FIG. 2 is an illustrative example of a reference frame on the basis of which the frame of FIG. 1 is to be encoded.
Figure 3:
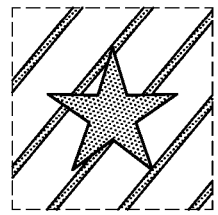
FIG. 3 is an illustrative example of a block of the frame of FIG. 1, to be encoded, transmitted and decoded by embodiments disclosed herein.
Figure 4:
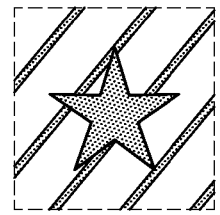
FIG. 4 is an illustrative example of an inter-prediction candidate for the block of FIG. 3.
Figure 5:
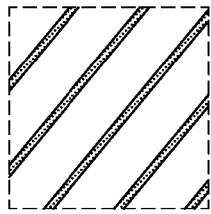
FIG. 5 is an illustrative example of an intra-prediction candidate for the block of FIG. 3.

An example of this scenario is illustrated in FIGS. 1 and 2. FIG. 1 shows a current frame to be encoded, while FIG. 2 illustrates a reference frame. FIG. 3 illustrates a block of the current frame from FIG. 1, for which a prediction is to be generated. FIG. 4 illustrates an intra-prediction candidate, while FIG. 5 illustrates an inter-prediction candidate. Obviously, neither prediction candidate is an accurate representation of the content of the current block as shown in FIG. 4.

Thus, an embodiment described herein forms a new prediction obtained by combining the two hypotheses, as being potentially better suited to predict the original content.

However, it should be noted that simply performing the average of each sample may also not be ideal. Depending on the accuracy of either the intra- or inter-predicted candidate, there may be many cases in which one of the two predictions may be better suited to represent the content of the current block, but still the other prediction can provide some missing information which would improve the prediction process. In such cases, performing weighted prediction of the two candidates has a potential advantage. By appropriately selecting the weights to perform the weighted prediction, a better combined prediction can be obtained.

An embodiment described herein employs a fixed set of weights. The weights are available in look-up tables, where different weights may be used for blocks with different characteristics, such as block size or depending on other available information. The look-up tables may be provided in advance to suitably configured encoders and decoders. Alternatively, the look up tables could be transmitted from an encoder to a decoder, either as a part of the transmission of the encoded video, or as a prior configuration transmission.

An index to extract the correct element from the look-up table is then decoded from the bitstream so that the correct set of weights can be selected and used when performing the prediction.

In another embodiment, rather than communicating an index to a LUT entry, the weight or weights can be directly extracted from the bitstream.

Figure 6:
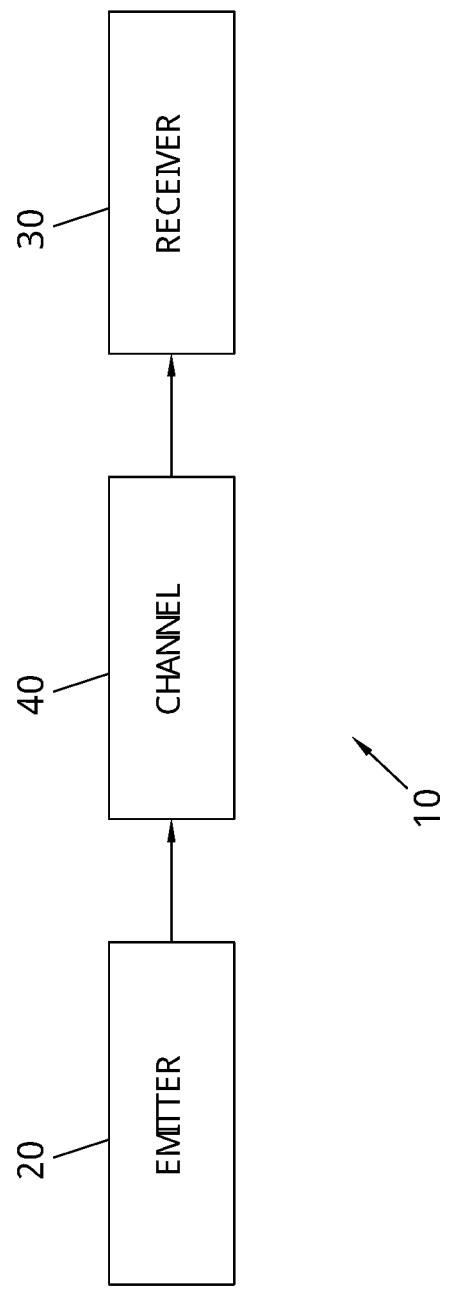
FIG. 6 is a schematic representation of a communications network in accordance with an embodiment.

As illustrated in FIG. 6, an arrangement is illustrated comprising a schematic video communication network 10, in which an emitter 20 and a receiver 30 are in communication via a communications channel 40. In practice, the communications channel 40 may comprise a satellite communications channel, a cable network, a ground-based radio broadcast network, a POTS-implemented communications channel, such as used for provision of internet services to domestic and small business premises, fibre optic communications systems, or a combination of any of the above and any other conceivable communications medium.

Furthermore, the disclosure also extends to communication, by physical transfer, of a storage medium on which is stored a machine readable record of an encoded bitstream, for passage to a suitably configured receiver capable of reading the medium and obtaining the bitstream therefrom. An example of this is the provision of a digital versatile disk (DVD) or equivalent. The following description focuses on signal transmission, such as by electronic or electromagnetic signal carrier, but should not be read as excluding the aforementioned approach involving storage media.

Figure 7:
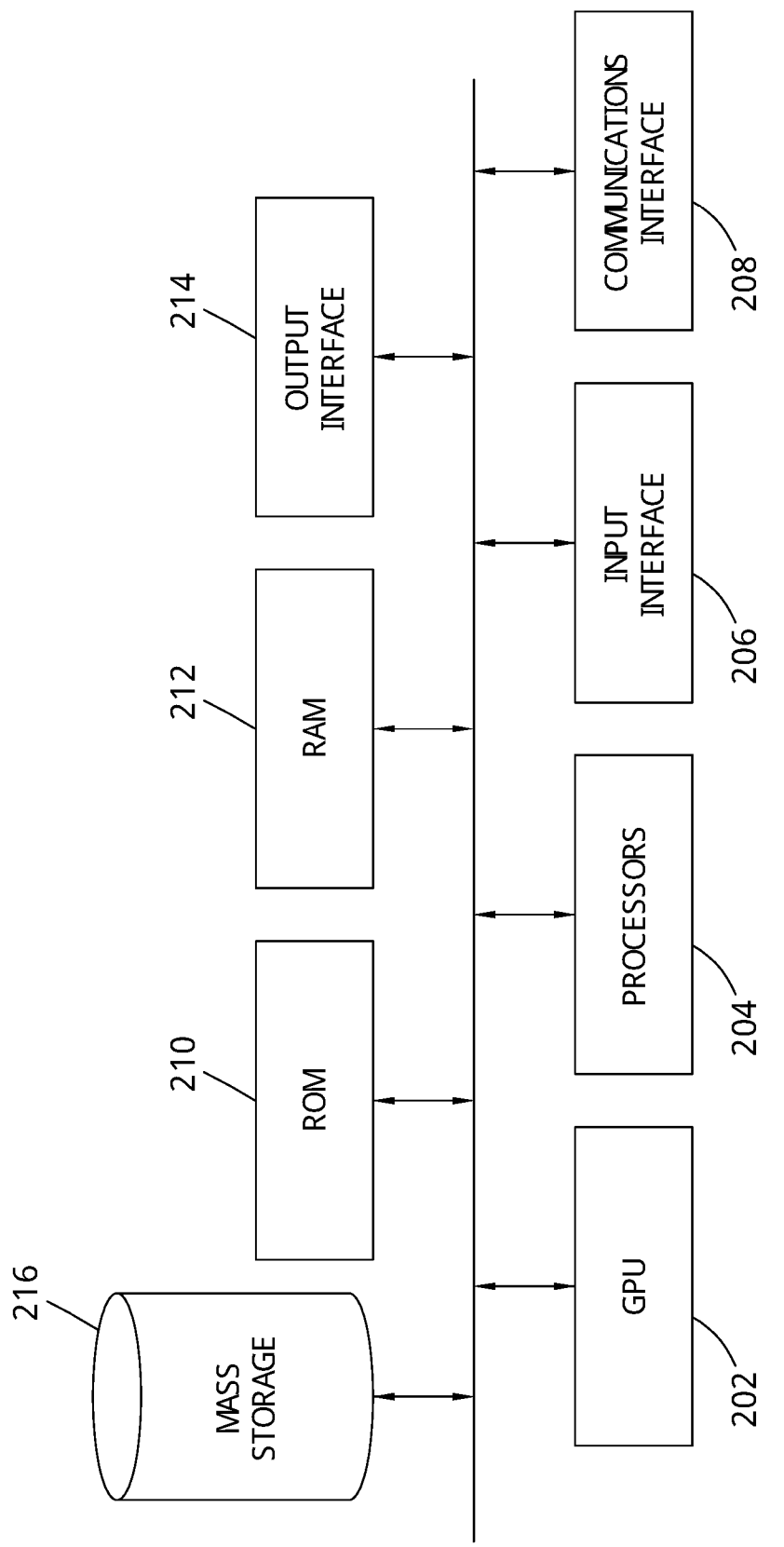
FIG. 7 is a schematic representation of an emitter of the communications network of FIG. 6.

As shown in FIG. 7, the emitter 20 is a computer apparatus, in structure and function. It may share, with general purpose computer apparatus, certain features, but some features may be implementation specific, given the specialised function for which the emitter 20 is to be put. The reader will understand which features can be of general purpose type, and which may be required to be configured specifically for use in a video emitter.

The emitter 20 thus comprises a graphics processing unit 202 configured for specific use in processing graphics and similar operations. The emitter 20 also comprises one or more other processors 204, either generally provisioned, or configured for other purposes such as mathematical operations, audio processing, managing a communications channel, and so on.

An input interface 206 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel, whether broadcast or end-to-end, with one or more recipients of signals. In the context of the present embodiment, the communications interface is configured to cause emission of a signal bearing a bitstream defining a video signal, encoded by the emitter 20.

The processors 204, and specifically for the benefit of the present disclosure, the GPU 202, are operable to execute computer programs, in operation of the encoder. In doing this, recourse is made to data storage facilities provided by a mass storage device 208 which is implemented to provide large-scale data storage albeit on a relatively slow access basis, and will store, in practice, computer programs and, in the current context, video presentation data, in preparation for execution of an encoding process.

A Read Only Memory (ROM) 210 is preconfigured with executable programs designed to provide the core of the functionality of the emitter 20, and a Random Access Memory 212 is provided for rapid access and storage of data and program instructions in the pursuit of execution of a computer program.

Figure 8:
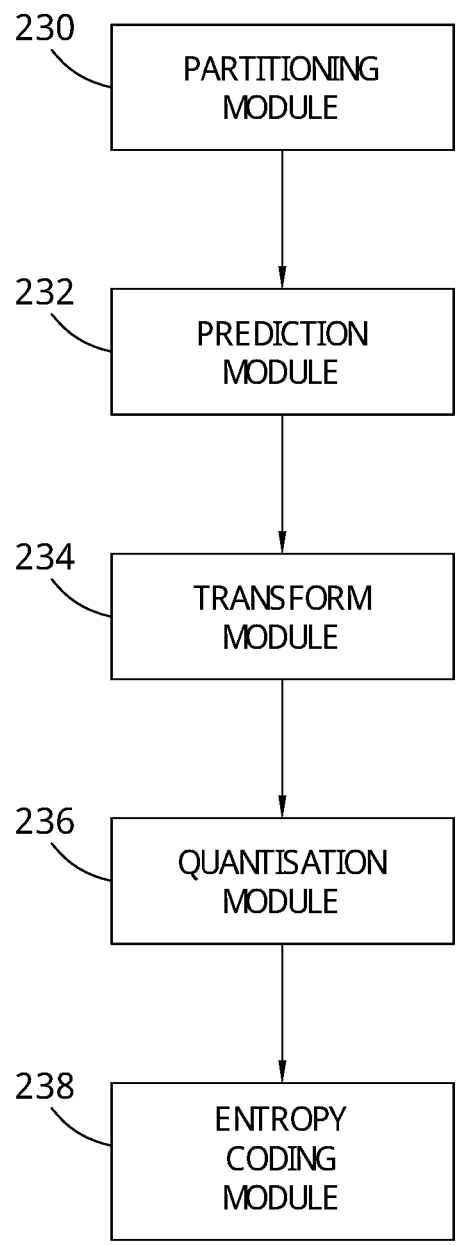
FIG. 8 is a diagram illustrating an encoder implemented on the emitter of FIG. 7.

The function of the emitter 20 will now be described, with reference to FIG. 8. FIG. 8 shows a processing pipeline performed by an encoder implemented on the emitter 20 by means of executable instructions, on a datafile representing a video presentation comprising a plurality of frames for sequential display as a sequence of pictures.

The datafile may also comprise audio playback information, to accompany the video presentation, and further supplementary information such as electronic programme guide information, subtitling, or metadata to enable cataloguing of the presentation. The processing of these aspects of the datafile are not relevant to the present disclosure.

Referring to FIG. 8, the current picture or frame in a sequence of pictures is passed to a partitioning module 230 where it is partitioned into blocks of a given size for sequential processing by the encoder. Each block is then input to a prediction module 232, which seeks to discard temporal and spatial redundancies present in the sequence and obtain a prediction signal using previously coded content. Information enabling computation of such a prediction is encoded in the bit stream. This information may comprise sufficient information to enable computation, including the possibility of inference at the receiver of other information necessary to complete the prediction.

The prediction signal is subtracted from the original signal to obtain a residual signal. This is then input to a transform module 234, which attempts to further reduce spatial redundancies within a block by using a more suitable representation of the data. The reader will note that, in some embodiments, domain transformation may be an optional stage and may be dispensed with entirely. Employment of domain transformation, or otherwise, may be signalled in the bitstream.

The resulting signal is then typically quantised by quantisation module 236, and finally the resulting data formed of the coefficients and the information necessary to compute the prediction for the current block is input to an entropy coding module 238 makes use of statistical redundancy to represent the signal in a compact form by means of short binary codes. Again, the reader will note that entropy coding may, in some embodiments, be an optional feature and may be dispensed with altogether in certain cases. The employment of entropy coding may be signalled in the bitstream, together with information to enable decoding, such as an index to a mode of entropy coding (for example, Huffman coding) and/or a code book.

By repeated action of the encoding facility of the emitter 20, a bitstream of block information elements can be constructed for transmission to a receiver or a plurality of receivers, as the case may be. The bitstream may also bear information elements which apply across a plurality of block information elements and are thus held in bitstream syntax independent of block information elements. Examples of such information elements include configuration options, parameters applicable to a sequence of frames, and parameters relating to the video presentation as a whole.

Figure 9:
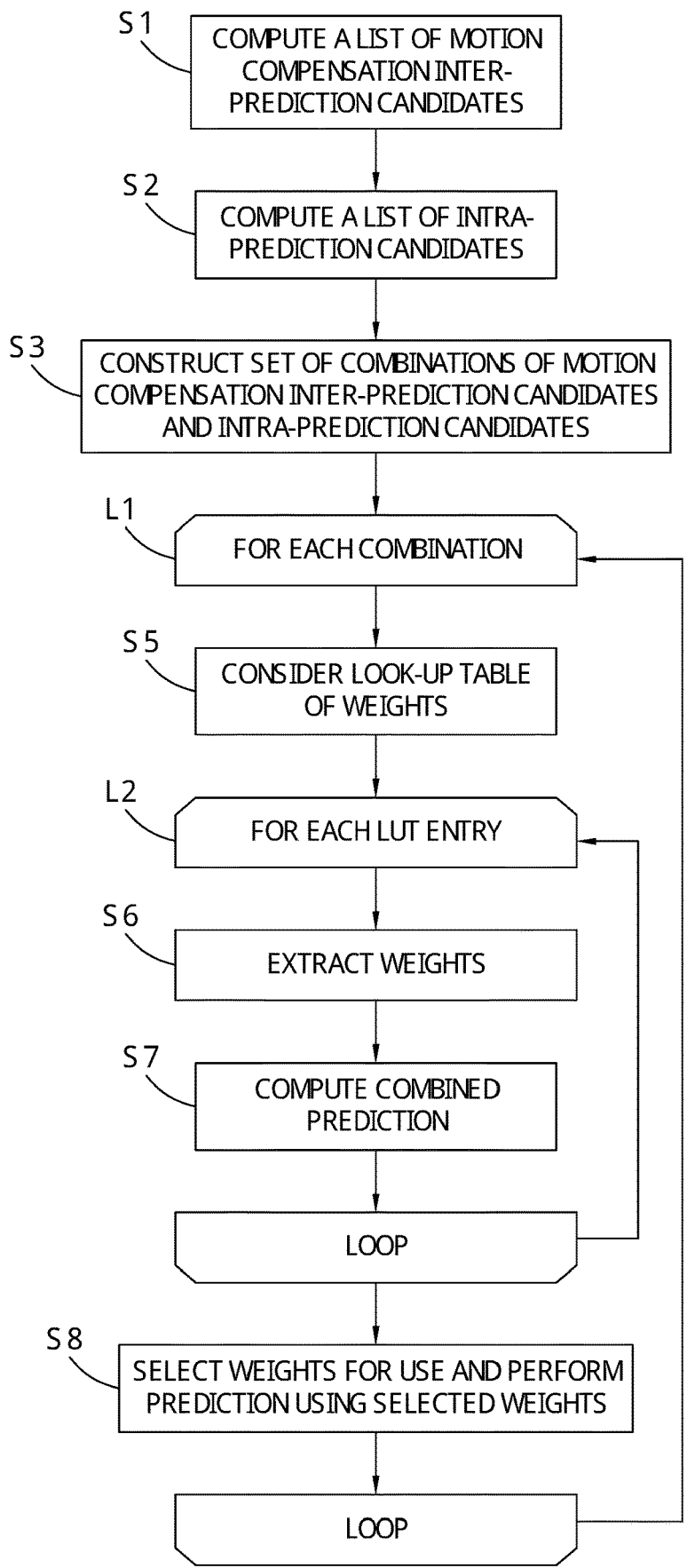
FIG. 9 is a flow diagram of a prediction process performed at a prediction module of the encoder of FIG. 8.

The prediction module 232 will now be described in further detail, with reference to FIG. 9. As will be understood, this is but an example, and other approaches, within the scope of the present disclosure and the appended claims, could be contemplated.

The following process is performed on each motion compensated block in an inter-predicted frame.

In step S1, a list of motion compensated inter-prediction candidates is computed.

In step S2, a list of intra-prediction candidates is computed. A number of intra-prediction modes can be implemented. Modes of intra-prediction can be defined on the basis of the extent to which, and the manner in which, neighbouring blocks are used to construct a block prediction. Various modes are defined in established technical standards, such as H.264/AVC and H.265/HEVC. A similar approach can be employed in this embodiment, so that "DC", "planar" "pure horizontal" and "pure vertical" intra-prediction modes can be defined. More modes than this can be defined, such as in H.264 in which an index with value between 0 and 8 can be used to indicate one of nine available modes. Not all modes need be employed. A more restrictive set may be considered, wherein fewer or even just one intra-prediction candidate are considered.

In step S3, a set of combinations of motion compensated inter-prediction candidates and considered intra-prediction candidates is constructed. Then a loop L1 is conducted over each identified combination.

Within this loop, in step S4 a look-up table (LUT) is considered containing weights to be used to perform weighted prediction between the two available candidates. The LUT may depend on characteristics of the current block (such as its width and height), or characteristics of the two prediction candidates (such as the motion vector magnitude of the inter-predicted candidate, or the intra-prediction mode of the intra-predicted candidate). In one embodiment, several LUTs may be considered, and the encoder may select one LUT and transmit in the bitstream information to enable identification or extraction of the correct LUT for use, among a plurality of available LUTs.

Further within loop L1, a loop L2 is performed over all elements in the LUT. For each element k, the following steps S6 and S7 are performed:

S6: A corresponding set of weights is extracted at position k in the LUT

S7: A combined prediction is computed performing weighted prediction using the two prediction candidates and the weights extracted at position k in the LUT Once loop L2 has been conducted over all elements in the LUT, then, in step S8, an element k0 is selected among the elements in the LUT. The selection process may depend for instance on the computation of a cost obtained for each item in the LUT, which may depend on the distortion and the bitrate necessary to encode the block using that given item. Other methods may be employed to perform this selection. The weights corresponding to the entry k0 in the LUT are then used to perform the final prediction for the current block. This ends loop L1 for an identified combination.

The selected index k0 is encoded in the bitstream along with the rest of the prediction information, including the information to enable computation of the motion-compensated prediction. This may comprise a motion vector and reference frame index, or a merge index (to identify the correct merge candidate from a predefined list), together with an index to identify the intra-prediction mode to use. In case only a single intra-prediction mode is considered, there is no need to signal the intra-prediction mode in the bitstream.

Figure 10:
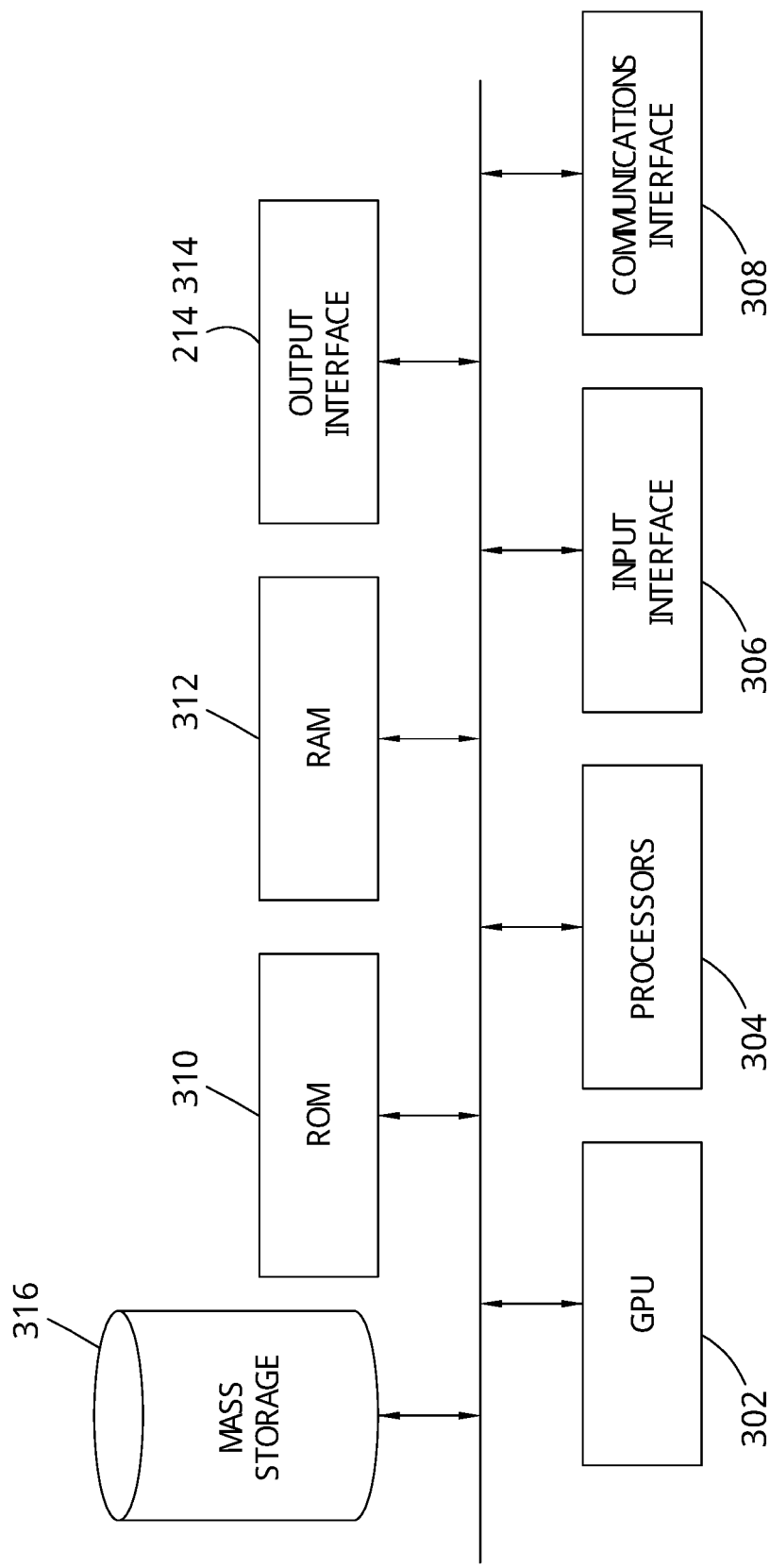
FIG. 10 is a schematic representation of a receiver of the communications network of FIG. 6.

The structural architecture of the receiver is illustrated in FIG. 10. It has the elements of being a computer implemented apparatus. The receiver 30 thus comprises a graphics processing unit 302 configured for specific use in processing graphics and similar operations. The receiver 30 also comprises one or more other processors 304, either generally provisioned, or configured for other purposes such as mathematical operations, audio processing, managing a communications channel, and so on.

As the reader will recognise, the receiver 30 may be implemented in the form of a set-top box, a hand held personal electronic device, a personal computer, or any other device suitable for the playback of video presentations.

An input interface 306 provides a facility for receipt of user input actions. Such user input actions could, for instance, be caused by user interaction with a specific input unit including one or more control buttons and/or switches, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 314 is operable to provide a facility for output of signals to a user or another device. Such output could include a television signal, in suitable format, for driving a local television device.

A communications interface 308 implements a communications channel, whether broadcast or end-to-end, with one or more recipients of signals. In the context of the present embodiment, the communications interface is configured to cause emission of a signal bearing a bitstream defining a video signal, encoded by the receiver 30.

The processors 304, and specifically for the benefit of the present disclosure, the GPU 302, are operable to execute computer programs, in operation of the receiver. In doing this, recourse is made to data storage facilities provided by a mass storage device 308 which is implemented to provide large-scale data storage albeit on a relatively slow access basis, and will store, in practice, computer programs and, in the current context, video presentation data, resulting from execution of an receiving process.

A Read Only Memory (ROM) 310 is preconfigured with executable programs designed to provide the core of the functionality of the receiver 30, and a Random Access Memory 312 is provided for rapid access and storage of data and program instructions in the pursuit of execution of a computer program.

Figure 11:
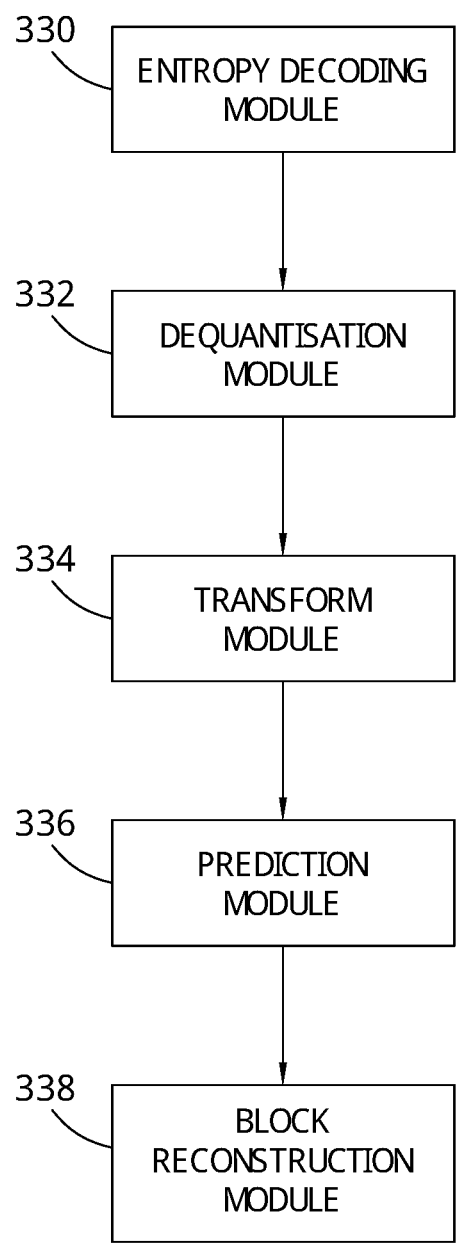
FIG. 11 is a diagram illustrating a decoder implemented on the receiver of FIG. 10.

The function of the receiver 30 will now be described, with reference to FIG. 11. FIG. 11 shows a processing pipeline performed by a decoder implemented on the receiver 20 by means of executable instructions, on a bitstream received at the receiver 30 comprising structured information from which a video presentation can be derived, comprising a reconstruction of the frames encoded by the encoder functionality of the emitter 20.

The decoding process illustrated in FIG. 11 aims to reverse the process performed at the encoder. The reader will appreciate that this does not imply that the decoding process is an exact inverse of the encoding process.

A received bit stream comprises a succession of encoded information elements, each element being related to a block. A block information element is decoded in an entropy decoding module 330 to obtain a block of coefficients and the information necessary to compute the prediction for the current block. The block of coefficients is typically dequantised in dequantisation module 332 and typically inverse transformed to the spatial domain by transform module 334.

As noted above, the reader will recognise that entropy decoding, dequantisation and inverse transformation would only need to be employed at the receiver if entropy encoding, quantisation and transformation, respectively, had been employed at the emitter.

A prediction signal is generated as before, from previously decoded samples from current or previous frames and using the information decoded from the bit stream, by prediction module 336. A reconstruction of the original picture block is then derived from the decoded residual signal and the calculated prediction block in the reconstruction block 338.

By repeated action of the decoding functionality on successively received block information elements, picture blocks can be reconstructed into frames which can then be assembled to produce a video presentation for playback.

Figure 12:
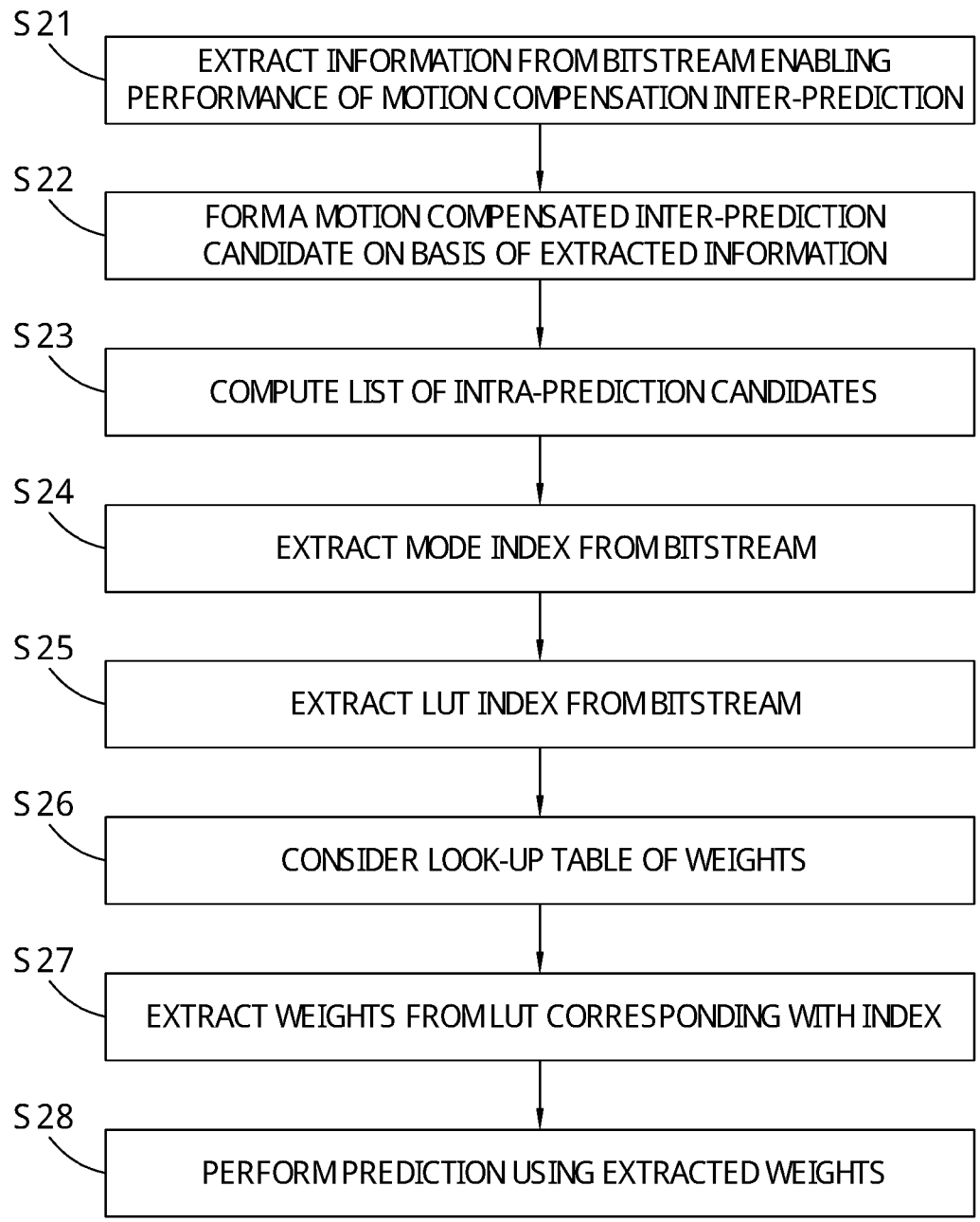
FIG. 12 is a flow diagram of a prediction process performed at a prediction module of the decoder of FIG. 8.

An exemplary decoder algorithm, complementing the encoder algorithm described earlier, is illustrated in FIG. 12.

As noted previously, the decoder functionality of the receiver 30 extracts from the bitstream a succession of block information elements, as encoded by the encoder facility of the emitter 20, defining block information and accompanying configuration information.

In general terms, the decoder avails itself of information from prior predictions, in constructing a prediction for a present block. In doing so, the decoder may combine the knowledge from inter-prediction, i.e. from a prior frame, and intra-prediction, i.e. from another block in the same frame.

Thus, for a motion compensated inter-predicted block in an inter-predicted frame, in step S21, the information enabling formation of a motion compensated inter-prediction candidate is extracted from the bitstream. The motion information enabling performance of the motion compensation may be obtained, for instance, by directly decoding the motion vector and reference frame index from the bitstream, or by means of a merge prediction process in which a merge candidate list is constructed, and a merge index is extracted from the bitstream to identify the correct merged motion information.

Once the information has been extracted, in step S22 a motion-compensated inter-prediction candidate is formed on the basis of the extracted information.

Then, in step S23, a list of intra-prediction candidates is computed, for instance the set of "DC", "planar" "pure horizontal" and "pure vertical" intra-prediction modes; a more restrictive set may be considered where fewer or even just one intra-prediction candidate are considered.

In step S24, an index is extracted from the bitstream to identify the intra-prediction mode to use; in case only a single intra-prediction mode is considered, there is no need to extract such a mode identification index from the bitstream and so this step could be dispensed with. This step selects one of the candidates computed in step S23 for use.

In step S25, an index k0 is extracted from the bitstream to identify the element to use from a pre-stored LUT, corresponding with the LUT used in the encoder process.

Then, in step S26, a look-up table (LUT) is considered containing weights to be used to perform weighted prediction between the two available candidates. A plurality of LUTs may be implemented, and the LUT to be used in a particular case may depend on characteristics of the current block (such as its width and height), or characteristics of the two prediction candidates (such as the motion vector magnitude of the inter-predicted candidate, or the intra-prediction mode of the intra-predicted candidate). In one embodiment, information may be extracted from the bitstream to enable selection of an appropriate LUT among a plurality of available LUTs. If a single LUT is used for all circumstances, then it will be unnecessary to signal which LUT should be used in a particular case.

In step S27, the weights at position k0 are extracted from the LUT identified in step S26. Then, in step S28, the weights are used to compute weighted average of the intra- and inter-predicted candidates and obtain a final prediction for the current block.

The process described above is carried out for all received block information elements, for the whole transmission. On this basis, formation of decoded blocks can be reconstructed into frames, and the frames into a reconstructed video presentation.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. Method of encoding a block of pixels in an image of a sequential plurality of images, comprising:
   computing a set of motion compensated inter-prediction candidates for the block of pixels on the basis of a reference image in the sequential plurality of images;
   computing a set of intra-prediction candidates for the block of pixels, based on a predetermined set of intra-prediction modes;
   assembling a set of combinations of said motion compensated inter-prediction candidates and intra-prediction candidates;
   determining, for a plurality of sets of parameters, each set of parameters configuring a parametric transformation of a one of the motion compensated inter-prediction candidate and a one of the intra-prediction candidates, a combined prediction for each combination of said motion compensated inter-prediction candidates and intra-prediction candidates, wherein at least one set of said parameters configures a parameter transformation comprising a weighted average of the one or more motion compensated inter-prediction candidates, and the one or more intra-prediction candidates governed by a weight or a combination of weights, wherein the weight or combination of weights comprises an entry in a look-up table with a corresponding weight index, where the weight or combination of weights represent how intra-prediction candidates and inter-prediction candidates are combined;
   assessing each combined prediction against a measurement;
   selecting one of the combined predictions on the basis of the measurement as an encoding of the block of pixels.

2. Encoder operable to perform a method in accordance with claim 1.

3. Signal generation apparatus comprising an encoder in accordance with claim 2.

4. A non-transitory storage medium storing data defining a bitstream, the bitstream being the product of a method of encoding in accordance with claim 1.

5. Method of decoding a bitstream comprising:
extracting from the bitstream motion predictor configuration information and, based on the motion predictor configuration information, computing one or more motion-compensated inter-prediction candidates for a block of samples;
extracting from the bitstream intra-prediction configuration information, and, based on the intra-prediction configuration information, computing one or more intra-prediction candidates, wherein intra-prediction candidates are obtained by an intra-prediction process for a block of samples;
extracting from the bitstream parameter transformation configuration information enabling determination of parameters for a parametric transformation of the one or more motion-compensated inter-prediction candidates, and the one or more intra-prediction candidates, the parameter transformation configuration information comprising a weight index;
extracting, from a look up table mapping weight indices against weights, a weight or combination of weights corresponding with the weight index, where the weights represent how intra-prediction candidates and inter-prediction candidates are combined;
determining parametric transformation parameters on the basis of the parameter transformation configuration information; and
computing a combined transformed prediction for said block of samples, by way of a parametric transformation of the one or more motion-compensated inter-prediction candidates, and the one or more intra-prediction candidates, the parametric transformation comprising a weighted average of the one or more motion compensated inter-prediction candidates, and the one or more intra-prediction candidates governed by the weight or combination of weights extracted from the look-up table.

6. A method in accordance with claim 5 wherein the computing of a combined transformed prediction for said block of samples, by way of a parametric transformation of the one or more motion-compensated inter-prediction candidates, and the one or more intra-prediction candidates, is on the basis of the extracted parameter transformation configuration information, and on the basis of inferred information generated by an inference process.

7. A method in accordance with claim 5 wherein the parameter transformation configuration information comprises at least one weight factor, and the method further comprises calculating weights as a function of the weight factor.

8. A method in accordance with claim 5 wherein the motion predictor configuration information comprises motion information and reference frame information, the method further comprising computing one or more merge candidates on the basis of the motion information and the reference frame information extracted from neighbouring blocks.

9. A method in accordance with claim 5 wherein the extracting from the bitstream parameter transformation configuration information enabling determination of parameters for a parametric transformation of the one or more motion-compensated inter-prediction candidates and the one or more intra-prediction candidates, comprises extracting parameters directly from the bitstream.

10. A method in accordance with claim 5 wherein the extracting from the bitstream parameter transformation configuration information enabling determination of parameters for a parametric transformation of the one or more motion-compensated inter-prediction candidates and the one or more intra-prediction candidates, includes combining the extracted configuration with existing parameter information, for other blocks of samples, to determine parameters for the current block.

11. A decoder configured to perform a decoding process in accordance with claim 5.

12. A signal receiving apparatus comprising a decoder in accordance with claim 11.

13. A computer program product comprising computer executable instructions stored on a non-transitory computer-readable medium, wherein the computer executable instructions, when executed by a computer apparatus cause the computer apparatus to perform a method in accordance with claim 5.

* * * * *